United States Patent [19]

Scott et al.

[11] Patent Number: 4,556,466

[45] Date of Patent: Dec. 3, 1985

[54] METHOD OF CONCENTRATING SILICA IN AN AQUEOUS ALKALI METAL SILICATE SOLUTION

[75] Inventors: Graham W. Scott, Northwich; James H. Steven, Runcorn, both of England

[73] Assignee: Imperial Chemical Industries plc, London, England

[21] Appl. No.: 653,046

[22] Filed: Sep. 21, 1984

[30] Foreign Application Priority Data

Sep. 23, 1983 [GB] United Kingdom ............... 8325478

[51] Int. Cl.$^4$ ........................ C25B 7/00; C25B 1/16
[52] U.S. Cl. ............................. 204/182.2; 204/94; 204/301; 204/182.5; 423/332; 423/335; 423/339
[58] Field of Search ............ 204/86, 94, 101, 180 P, 204/301; 423/332, 335, 339

[56] References Cited

U.S. PATENT DOCUMENTS

| | | | |
|---|---|---|---|
| 3,654,105 | 4/1972 | Chilton | 204/101 |
| 3,668,088 | 6/1972 | Iler | 204/101 |
| 4,124,471 | 11/1978 | Lieb et al. | 204/180 P |
| 4,147,605 | 4/1979 | Schenker et al. | 204/180 P |
| 4,203,822 | 5/1980 | Schenker et al. | 204/180 P |
| 4,303,487 | 12/1981 | Carlin et al. | 204/180 P |
| 4,387,008 | 6/1983 | Winyall et al. | 204/101 |
| 4,410,405 | 10/1983 | Bergna | 204/180 P |
| 4,508,607 | 4/1985 | Winyall et al. | 204/180 P |

FOREIGN PATENT DOCUMENTS 39-2234 4/1964 Japan ..................... 204/180 P

Primary Examiner—Andrew H. Metz
Assistant Examiner—Terryence Chapman
Attorney, Agent, or Firm—Cushman, Darby & Cushman

[57] ABSTRACT

The ratio of silica to alkali in silicate liquors is increased, for example to convert alkaline grades to neutral grades, by passing the liquor through an electrodialysis stack comprising spaced ion-exchange membranes mounted between an anode and a cathode, the membranes forming cell triplets of a concentrating cell between an ion-exchange membrane and a fine cation exchange membrane, a diluting cell between the first cation exchange membrane and a second cation exchange membrane and a proton donor cell between the second cation exchange membrane and an adjacent anion-exchange membrane, the method comprising passing the silicate liquors through the diluting cells in the stack, passing water or an aqueous solution through the concentrating cells and passing an acidic solution through the proton donor cells whereby the silicate liquor is caused to lose alkali metal ions to the concentrating liquor and to receive hydrogen ions from the proton donor liquor.

8 Claims, 2 Drawing Figures

METHOD OF CONCENTRATING SILICA IN AN AQUEOUS ALKALI METAL SILICATE SOLUTION

BACKGROUND OF THE INVENTION

1. Field of the Invention

The invention relates to the preparation of alkali metal silicates, and especially to sodium silicates, as these are used commercially for a wide range of applications.

2. Description of Related Art

Most sodium silicate liquors are produced by the Furnace route in which soda ash (sodium carbonate) and sand are fused together at high temperatures, e.g. around 1500° C. and the resulting glass is dissolved under pressure. Silicates in a wide range of grades can be produced in this manner, varying from those having $SiO_2:Na_2O$ weight ratio in the range 1.65 to 2.8 (often referred to as alkaline grades) to grades having higher ratios, e.g. up to about 4.0 (often referred to as neutral grades even though their solutions generally have pH values in excess in 11). Unfortunately, this route is highly energy dependent, and hence expensive to operate.

An alternative, lower energy, process, known as the Hydrothermal process, is also currently being operated. This process involves digestion of sand with caustic soda under pressure, and with much lower temperatures being required, significant savings in energy and manpower costs are achievable by this route. Unfortunately this process is unable to produce neutral grades. It has previously been proposed to overcome this by electrolysis of the resulting sodium silicate liquor in a standard electrolytic cell, having an anode compartment (containing an anode) and a cathode compartment (containing a cathode), the two compartments being separated by a single cation exchange membrane to keep the electrolysis products apart. This relies on an anode reaction to destroy hydroxyl ions in the anode compartment (forming water and releasing gaseous oxygen) while forming new hydroxyl ions in the cathode compartment (with release of hydrogen at the electrode). The driving current is carried through the membrane by the sodium ions passing through it and the net effect is the removal of sodium hydroxide drom one stream to the other, eveh though the individual hydroxyl ions lost from one stream are not those being newly created in the other. Such electrolytic methods for increasing the $SiO_2:Na_2O$ weight ratios are claimed to be effective for dilute solutions, i.e. water contents of at least 75 weight %, and hence for enabling neutral grades to be produced via the Hydrothermal process more cheaply than via the Furnace route.

SUMMARY OF THE INVENTION

We have now devised another method for increasing the ratio of silica to alkali, which method can be operated with even lower energy costs, which can avoid the risk of electrode contamination inherent in electrolytic cells, and which can be used with silicate solutions of significantly higher solids content (thereby reducing evaporation costs). Accordingly we now provide a method for increasing the ratio of silica to alkali in an aqueous solution of alkali metal silicate, which method comprises passing the aqueous solution through an electrodialysis stack comprising a plurality of ion exchange membranes, each membrane having at least one adjacent membrane from which it is separated by at least one spacer, the spacer being shaped and positioned to form with the two membranes a cell having an inlet and outlet such that fluid can be caused to flow through the cell between the membranes and in contact therewith, the membranes being a repeated series of three membranes comprising an anion and first and second cation exchange membranes respectively, the membranes together with the spacers between them forming a repeating cell triplet comprising in sequence a concentrating cell formed by the anion exchange membrane and the first cation exchange membrane, a diluting cell formed by the first cation exchange membrane and the second cation exchange membrane, and a proton donor cell formed by the second cation exchange membrane and a further anion exchange membrane, each of the individual cells being free from electrodes but the stack having adjacent each end cell thereof an electrode compartment which contains an electrode separated from the contents of its adjacent end cell by the ion exchange membrane defining the boundary of that cell; the method further comprising feeding the solution of alkali metal silicates to the diluting cells, water or an aqueous solution to the concentrating cells and an acidic aqueous solution to the donor cells, and applying a DC potential to the electrodes such that the electrode on the donor cell side of the diluting cells becomes an anode and the electrode on the concentrating cell side of the diluting cells becomes a cathode; whereby the silicate streams are caused to loss sodium ions to the concentrating streams and receive hydrogen ions from the donor streams, as they flow through the stack.

BRIEF DESCRIPTION OF THE DRAWINGS

This method operates by transferring ions through the membranes from one stream to another rather than by the previously known methods of destroying hydroxyl ions in the silicate liquor stream and forming fresh hydroxyl ions in the adjacent stream. To illustrate how this is achieved, a specific embodiment of the invention will now be described with reference to the accompanying drawings, in which.

DESCRIPTION OF THE PREFERRED EMBODIMENTS

Figure 1:
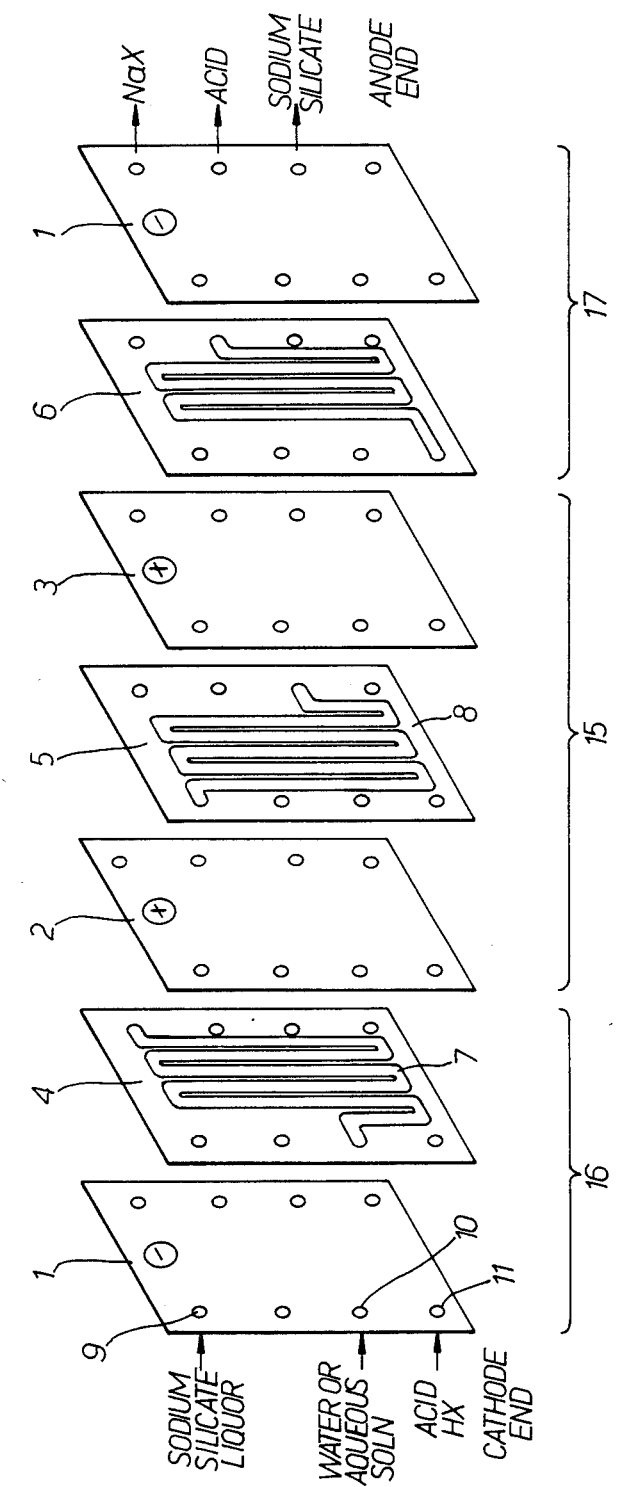
FIG. 1 is an exploded view of part of an electrodialysis stack showing how anion and cation exchange membranes are arranged with the appropriate spacers between them.

In FIG. 1, anion exchange membranes 1 and first and second cation exchange membranes 2, 3 are arranged as a repeated sequence throughout the stack with typically several hundred membranes being used in a stack for a commercial production plant. Between adjacent membranes are spacers 4, 5, 6 of three sorts, one 4 for the concentrating stream, another 5 for the diluting silicate liquor stream and the other 6 for the proton donor streams; although in practice the spacers themselves are usually of identical asymmetric shape, being orientated differently to give the different configurations necessary, e.g. as shown in the drawings where four inlet and four outlet manifolds are formed and hence are available for use. Only three of each are actually used here, but the forth hole in the spacer is still needed to avoid blocking of manifolds in some orientations. The spacers each have a serpentine slot 7 providing a tortuous path along which liquid can flow fron one end to the other, in contact with the adjacent membranes 1, 2, 3. Around the inner tortuous path region is a continuous edge portion 8 to provide a seal against loss of liquid through the edges, each adjacent pair of membranes and their intervening spacer forming a cell through which the liquids can flow, each membrane thus also being part of the two cells on either side of it. Extending right through the stack are six manifolds 9–14 formed by aligned holes in the edge portions of the membranes and spacers. The tortuous paths of alternate cells connect different manifolds, so that in one cell a sodium silicate liquor inlet manifold 9 is connected to a sodium silicate outlet manifold 13 by the tortuous path, thus producing a diluting cell 15 for carrying the diluting liquor stream. In the adjacent concentrating cell 16, the tortuous path connects the inlet manifold 10 with outlet manifold 12 to carry the water or aqueous solutions concentrating streams and the acidic donor stream is provided through the inlet manifold 11 to the proton donor cell 17, to emerge through outlet manifold 14. The whole stack is completed by an anode compartment at one end and a cathode compartment at the other (neither compartment being shown in FIG. 1), there being no electrodes in the individual diluting, concentrating and donor cells.

Figure 2:
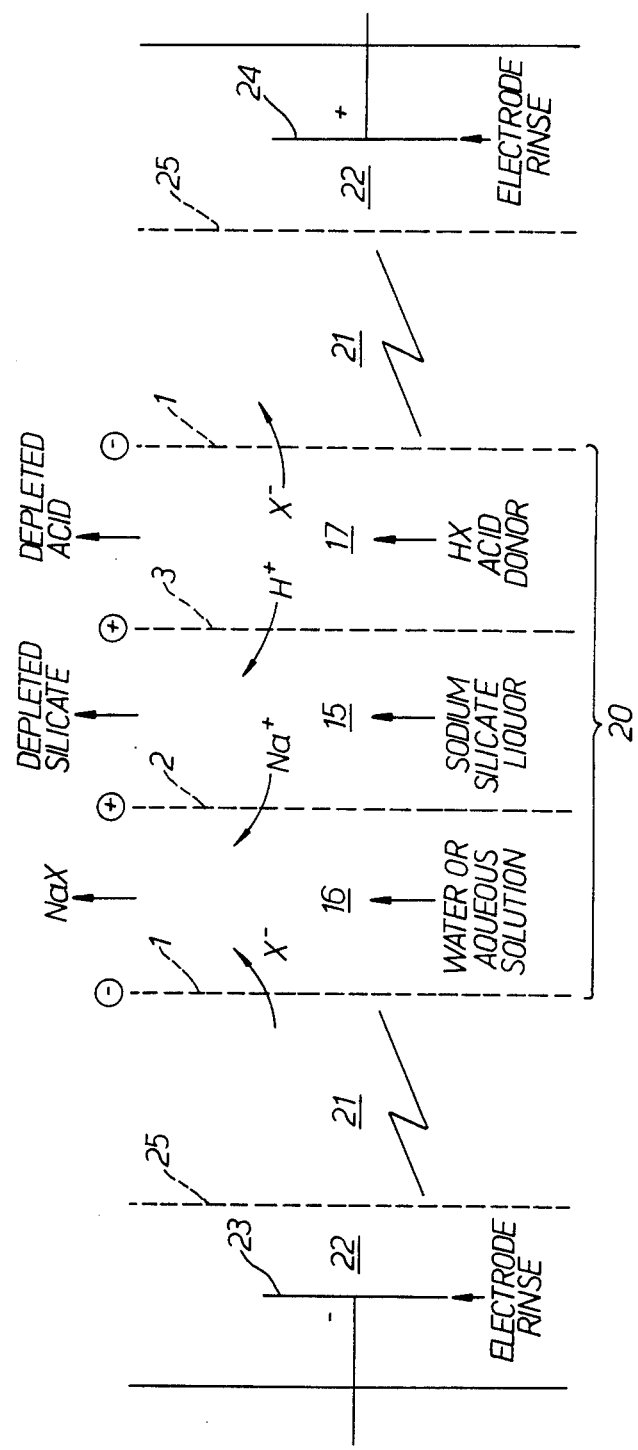
FIG. 2 is diagrammatic representation of a typical cell triplet showing ion movements between the cells.

FIG. 2 shows a single cell triplet 20 comprising a diluting cell 15 carrying a sodium silicate liquor stream, a concentrating cell 16 for receiving migrating ions, and a proton donor cell 17 carrying dilute acid solution. On either side of the cell pair are shown spaces 21 representing the remaining cell pairs of the stack. At either end are electrode compartments 17 containing a cathode 23 and an anode 24 respectively. Electrode rinse streams are passed through the electrode compartments, and these are separated from the contents of the adjacent end cells of the stack by the ion exchange membranes 25 forming the outer boundaries of those end cells.

In both drawings, a positive or negative sign on a membrane is meant to indicate the ion species which will pass through the membrane rather than the ions of which it is formed. Thus for example, a cation exchange membrane comprising immobilised anions will pass cations but block anions, and is thus represented in these drawings with a positive sign.

In use, sodium silicate liquor is supplied to the appropriate manifold 9 which distributes it to all the diluting cells 15. Water or aqueous solution is fed to inlet manifold 10 and this is likewise distributed to flow through all the concentrating cells 16, and a dilute acid is fed to the third manifold 11 by which it is distributed to all the proton donor cells 17. As the silicate liquor flows along the tortuous path between the membranes, the sodium ions are attracted towards the cathode, and some will pass through the cation exchange membrane into the adjacent concentrating cell 16. However, once in that adjacent cell they are trapped and prevented from travelling further towards the cathode by the next membrane, which is an anion exchange membrane. The anions of the sodium silicate liquor, i.e. the hydroxyl and silicate ions, are prevented from migrating out of that cell in the direction of the anode by the cation exchange membrane 3 forming the cell wall on that side.

The adjacent cell on the anode side is the proton donor cell carrying free protons and free anions such as chloride ions for example. Under the influence of the stack voltage, the protons will move towards the cathode and some will pass through the cation exchange membrane 3 into the silicate stream, where they will form water with the free hydroxyl ions in that stream. The chloride ions will likewise migrate towards the anode and some will pass through the anion exchange membrane 1 into the adjacent concentrating stream.

The overall result of these migrations is that the concentrating stream becomes an increasingly concentrated salt solution. The acidic donor stream progressively loses both its anions and its protons, and the sodium silicate liquor becomes progressively depleted in both sodium and hydroxyl ions.

As will be appreciated from the above summary, the concentrating stream merely acts as a dump for receiving the waste ions. Provided it will pass electrical current, the nature of the stream is therefore largely immaterial, but we prefer to use a solution of the salt which it receives, the solution being initially of sufficient strength to provide good conductivity at the start of the operation.

Depletion of the sodium silicate liquor by the present method is achieved by migration of ions without any of these ions being produced by electrode reactions. However, even the present migratory method cannot be totally divorced from electrode reactions, as it is the electrode reactions occurring at either end of the stack that power the migrations through the cell membranes. However, the reactions at the single pair of electrodes suffices to furnish the migrations of the whole stack, typically comprising up to several hundred cell pairs in a commercial plant scale stack, and the electrode energy costs are shared by the whole stack. Moreover, as the electrode reactions themselves do not affect the nature of the migrations throughout the stack, the most cost effective electrode reactions can be selected and carried out by bathing the electrodes in a rinse appropriate to the selected reaction. In particular, a preferred process is one which comprises maintaining each electrode in an electrode rinse comprising a conducting liquid substantially free from silicate ions.

The intermembrane spacers perform two main roles, i.e. to hold the membranes spaced apart to enable liquids to flow between them, and to distribute the liquid flow by defining the path for it to take. Usually they are also required to promote turbulence in the liquid as it flows. There are two types of spacer presently in use, these being known generally as sheet flow and tortuous path spacers. The former may be merely a plastic gasket sealing around the perimeter of the cell, with built in manifolds and entry and exit ports, but usually it also incorporates a turbulence promoting plastic mesh. In contrast a tortuous path spacer (e.g. as shown in FIG. 1) confines the liquid flow to a serpentine path winding its way to and fro between and in contact with the membranes, giving a flow path which compared with that provided by a sheet flow spacer, is longer, narrower and usually of constant cross sectional area. Examples of tortuous path spacers are those used by Ionics Inc. in their electrodialysis plants.

Sheet flow spacers require much lower fluid velocities (5–20 cm sec$^{-1}$) for a similar degree of turbulence. They also mask the ion exchange membrane to a lesser extent than do the tortuous path spacers and are therefore more economical in membrane usage. The high liquid velocities used in tortuous path stacks result in higher pressure drops than are generally used in sheet flow systems, a typical pressure drop through a commerical tortuous path cell being over 2 bar. However, in the present process there is a tendency for silica to become deposited readily if the optimum conditions are unduly departed from, and we have now found that inclination to deposit silica inadvertently or even to build up deposits of silica in the cells, is significantly less with the tortuous path configuration. Hence in the present process we prefer that at least the spacers of the cells carrying the silicate liquors be of the tortuous path type.

Even the so-called neutral grades of sodium silicate liquors generally have pH values only as low as 11, and when reduced to a pH below 9, silica will generally be deposited. We therefore prefer to keep the pH of the silicate liquor above 9 throughout the cell, including localised conditions that may occur adjacent to the membranes. To this end we prefer to use a current density which is less than 25 mA cm$^{-2}$, a flow velocity greater than 25 cm sec$^{-1}$ and a temperature greater than 25° C.

The onset of silica deposition can generally be detected by monitoring the stack voltage, a rise in the voltage inidicating silica deposition. A particularly preferred process is one comprising maintaining the above conditions within at least the silicate liquor streams, monitoring the voltage across the electrodes, and whenever the voltage starts to rise, decreasing the current density within the range 3–25 mA cm$^{-2}$, and/or increasing the flow velocity within the range 25–50 cm sec$^{-1}$ by an amount sufficient at least to stop any further rise. In carrying out this particular preferment it is desirable to maintain the current density as high as possible to maximise throughput. A higher current density may generally be used with a higher flow rate, but at the expense of higher energy consumption in achieving that higher flow rate. Hence a corollary to the above particular preferment is that while monitoring the voltage it is also preferred to raise the current density to the highest value within the range 3–25 mA cm$^{-2}$ and/or to reduce the flow velocity to the lowest value within the range 25–50 cm sec$^{-1}$ which can be achieved without substantial increase in stack voltage. While it is desirable to use as high a temperature as possible, most currently available membranes impose an upper limit of 60°–65° C. although higher temperatures could be used to advantage if suitable membranes should become available in the future. However, where the raw liquor is available (e.g. direct from the hydrothermal process) at only some intermediate temperature e.g. 30°–40° C., there would seem to be little advantage in supplying further heat.

Preferred initial concentrations for the silicate liquors lie within the range 20–30 wt % SiO$_2$, especially around the middle of that range for a typical alkaline silicate having a weight ratio of 2.4, this gives a total solids content range of (20+8.3=) about 28 to (30+12.5=) about 43 wt %, and correspondingly a water content of 72 to 57 wt % (this being a lower water content than the 75 wt % desirable when using an electrolytic cell). The lower the water content, the lower is the total quantity of energy needed to evaporate it off.

We claim:
1. A method for increasing the ratio of silica to alkali in an aqueous solution of alkali metal silicate which method comprises:
    (1) passing the aqueous silicate solution through an electrodialysis stack, the stack comprising ion exchange membranes mounted between electrodes and separated by spacers to form a plurality of cells through which a fluid can be caused to flow, the membranes being arranged in triplets of an anion-exchange membrane, a first cation-exchange membrane and a second cation-exchange membrane to form cell triplets comprising a concentration cell between the anion-exchange membrane and the first cation-exchange membrane, a diluting cell between the first and second cation-exchange membranes and a proton donor cell between the second cation-exchange membrane and the anion-exchange membrane of the adjacent membrane triplet,
    (2) applying a DC potential to the electrodes to form an anode and a cathode,
    (3) feeding the silicate solution to the diluting cells in the stack,
    (4) feeding water or an aqueous solution to the concentrating cells in the stack,
    (5) feeding an acidic aqueous solution to the proton donor cells in the stack, and
    (6) withdrawing from the diluting cells a silicate solution depleted of alkali metal ions.

2. A method as claimed in claim 1 wherein the pH of the silicate solution is maintained above 9 throughout its passage through the cells.

3. A method as claimed in claim 1 wherein the voltage across the electrodes in monitored and whenever the voltage starts to rise the current density is decreased and/or the silicate solution flow density is increased by an amount sufficient to at least stop any further rise in the voltage.

4. A method as claimed in claim 3 wherein the current density is maintained in the range 3–25 mA cm$^{-2}$ and the solution flow density is maintained in the range 25–50 cm sec$^{-1}$.

5. A method as claimed in claim 3 or claim 4 which utilizes the maximum current density and the minimum solution flow velocity which can be achieved without a substantial increase in stack voltage.

6. A method as claimed in claim 4 wherein current density is less than 25 mA cm$^{-2}$, solution flow viscosity is greater than 25 cm sec$^{-1}$ and the temperature of the solution is greater than 25° C.

7. A method as claimed in claim 1 wherein the silicate solution initially contains 20–30% by weight silica.

8. A method as claimed in claim 1 wherein said aqueous solution fed to the other cells in the stack is a solution of an alkali metal hydroxide.

* * * * *